(12) United States Patent
Koshihara et al.

(10) Patent No.: US 8,629,858 B2
(45) Date of Patent: Jan. 14, 2014

(54) LIQUID CRYSTAL DEVICE, METHOD OF DRIVING LIQUID CRYSTAL DEVICE AND ELECTRONIC APPARATUS

(75) Inventors: Takeshi Koshihara, Suwa (JP); Sumio Utsunomiya, Matsumoto (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 1025 days.

(21) Appl. No.: 12/032,088

(22) Filed: Feb. 15, 2008

(65) Prior Publication Data

US 2008/0218648 A1 Sep. 11, 2008

(30) Foreign Application Priority Data

Mar. 6, 2007 (JP) ................................. 2007-055189

(51) Int. Cl.
*G09G 3/36* (2006.01)
*G09G 5/00* (2006.01)
*G06F 3/038* (2013.01)

(52) U.S. Cl.
USPC ................ 345/204; 345/87; 345/96; 345/205

(58) Field of Classification Search
USPC .................... 345/76–80, 87, 173–178, 204
See application file for complete search history.

(56) References Cited

U.S. PATENT DOCUMENTS

| 5,510,813 | A | * | 4/1996 | Makinwa et al. | 345/173 |
|---|---|---|---|---|---|
| 6,927,828 | B2 | * | 8/2005 | Shih et al. | 345/103 |
| 6,933,756 | B2 | * | 8/2005 | Miyazawa | 345/204 |
| 7,557,869 | B2 | * | 7/2009 | Bang et al. | 345/173 |
| 2006/0187176 | A1 | * | 8/2006 | Yang | 345/100 |

FOREIGN PATENT DOCUMENTS

JP  A 2006-145895  6/2006

* cited by examiner

*Primary Examiner* — Bipin Shalwala
*Assistant Examiner* — Ryan A Lubit
(74) *Attorney, Agent, or Firm* — K&L Gates LLP

(57) ABSTRACT

A liquid crystal device includes a first substrate, a second substrate, liquid crystal which is in between the first and the second substrate, and a detection electrode provided on a side of the first substrate, opposite to a side of the liquid crystal. The second substrate includes pixel electrodes connected through switching elements to signal lines, opposite electrodes formed between the pixel electrodes and the liquid crystal and are connected to control lines, a selection circuit that conducts the switching element during a selection period and interrupts conduction after the selection period has elapsed, a signal supplying circuit which supplies a data electric potential during the selection periods, a electric potential control circuit which sets the control lines to an predetermined electric potential when the scanning lines to the control line is selected and sets to a reference electric potential after the selection period has elapsed.

6 Claims, 7 Drawing Sheets

LIQUID CRYSTAL DEVICE, METHOD OF DRIVING LIQUID CRYSTAL DEVICE AND ELECTRONIC APPARATUS

BACKGROUND

1. Technical Field

The present invention relates to a technology for driving a liquid crystal device in which an electrode (hereinafter, "detection electrode") is formed to detect a contact of a finger or a pen on the basis of variation in capacitance.

2. Related Art

An existing liquid crystal device that is provided with a capacitance type touch panel has been proposed. A detection electrode is arranged in proximity to the liquid crystal device, so that a capacitor is associated between the detection electrode and elements in the liquid crystal device (for example, electrode or wiring). Thus, there is a problem that noise is generated in the detection electrode because of changes in signals used for image display in the liquid crystal device. Japanese Unexamined Patent Application Publication No. 2006-146895 describes a technology for removing noise due to variation in electric potential of an opposite electrode from a detection signal on the basis of variation in capacitance of the detection electrode.

However, in the technology described in JP-A-2006-146895, a complex circuit is required for removing noise from the detection signal, so that there is a problem that a circuit size increases and manufacturing costs also increase.

SUMMARY

An advantage of some aspects of the invention is that it suppresses an influence of noise generated in the detection electrode with a simple structure.

An aspect of the invention provides a liquid crystal device. The liquid crystal device includes a first substrate, a second substrate, liquid crystal, a detection electrode, a plurality of scanning lines, at least one signal line, a plurality of control lines, a plurality of pixel circuits, a selection circuit, a signal supplying circuit, and an electric potential control circuit. The first substrate is opposed to the second substrate. The liquid crystal is sealed in a gap between the first substrate and the second substrate. The detection electrode is provided on a side of the first substrate, opposite to a side on which the liquid crystal is provided. The detection electrode detects a contact on the basis of variation in capacitance. The at least one signal line intersects with the plurality of scanning lines. The plurality of control lines are provided in correspondence with the scanning lines. The plurality of pixel circuits are formed in the second substrate at positions corresponding to intersections of the at least one signal line and the plurality of scanning lines. Each of the plurality of pixel circuits includes a liquid crystal capacitor formed of a pixel electrode that is connected through a switching element to a corresponding one of the at least one signal line, an opposite electrode that is formed between the pixel electrode and the liquid crystal and is connected to a corresponding one of the control lines, and the liquid crystal to which fringe electric field generated between the pixel electrode and the opposite electrode is applied. The selection circuit selects each of the plurality of scanning lines in units of selection period. The selection circuit conducts the switching element of the pixel circuit corresponding to the scanning line that is selected during the selection period and interrupts conduction after the selection period has elapsed. The signal supplying circuit supplies a data electric potential (for example, an electric potential VDP or an electric potential VDN shown in FIG. 4) corresponding to positive polarity writing or negative polarity writing to the signal line during each of the selection periods. The electric potential control circuit sets each of the plurality of control lines, in a selection period when a corresponding one of the scanning lines to the control line is selected, to an electric potential lower than a reference electric potential during the positive polarity writing and to an electric potential higher than the reference electric potential during the negative polarity writing, while setting each of the plurality of control lines to the reference electric potential after the corresponding selection period has elapsed.

According to the above configuration, among the plurality of control lines, only an electric potential of the control line corresponding to the scanning line selected by the selection circuit varies in the selection period, while the control lines corresponding to the non-selected scanning lines are maintained at the reference electric potential. Thus, for example, in comparison with a configuration in which an electric potential of an opposite substrate that continuously extends over the entire surface of the first substrate periodically varies, it is possible to reduce noise of the detection electrode due to variation in electric potential of the opposite electrodes. The liquid crystal device according to the aspects of the invention may be used in various electronic apparatuses, such as a personal computer or a cellular phone.

In the aspect of the invention, the detection electrode may be formed on a surface of the first substrate, which is opposite to a surface on which the liquid crystal is provided. According to the above aspect, noise of the detection electrode due to variation in electric potential of the opposite electrodes is suppressed while a configuration of the liquid crystal device is simplified in comparison with a configuration in which the detection electrode is formed on a substrate independent of the first substrate.

Another aspect of the invention provides a method of driving a liquid crystal device. The liquid crystal device includes a first substrate, a second substrate opposed to the first substrate, liquid crystal sealed in a gap between the first substrate and the second substrate, a plurality of scanning lines, at least one signal line that intersects with the plurality of scanning lines, a plurality of control lines that are provided in correspondence with the plurality of scanning lines, a plurality of pixel circuits formed in the second substrate at positions corresponding to intersections of the at least one signal line and the plurality of scanning lines. Each of the plurality of pixel circuits includes a liquid crystal capacitor, which is formed of a pixel electrode, an opposite electrode that is formed between the pixel electrode and the liquid crystal and is connected to a corresponding one of the control lines, and the liquid crystal to which fringe electric field generated between the pixel electrode and the opposite electrode is applied. The liquid crystal device further includes a detection electrode that is provided on a side of the first substrate, opposite to a side on which the liquid crystal is provided and that detects a contact on the basis of variation in capacitance. The method of driving the liquid crystal device according to the aspect of the invention includes selecting each of the plurality of scanning lines in units of selection period, connecting the pixel electrode of the pixel circuit corresponding to the selected scanning line to a corresponding one of the at least one signal line during the selection period and interrupting the pixel electrode of the pixel circuit from a corresponding one of the at least one signal line after the selection period has elapsed, supplying a data electric potential corresponding to positive polarity writing or negative polarity writing to the signal line during the corresponding selection period, setting each of the plurality of control lines, in a selection period when a corresponding one of the scanning lines to the control line is selected, to an electric potential lower than a reference electric potential during the positive polarity writing and to an electric potential higher than the reference electric potential during the negative polarity writing, while setting each of the plurality of control lines to the reference electric potential after the corresponding selection period has elapsed. According to the above method, the same function and advantageous effects as those of the liquid crystal device according to the aspects of the invention are obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

A: Liquid Crystal Device

Figure 1:
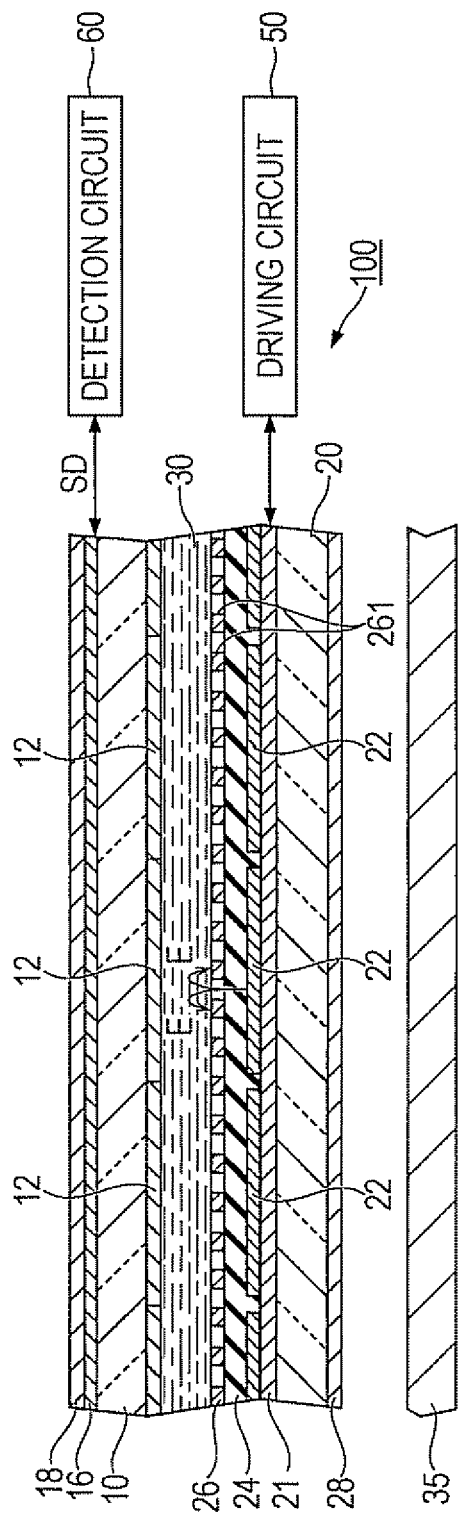
FIG. 1 is a cross-sectional view that shows a configuration of a liquid crystal device according to an embodiment of the invention.

FIG. 1 is a cross-sectional view that shows a configuration of a liquid crystal device according to one embodiment of the invention. The liquid crystal device 100 is a capacitance type touch panel liquid crystal display device provided with a function to display an image by means of optical action of liquid crystal and a function to detect the position of a portion which a finger or a pen contacts or accesses (hereinafter, referred to as "contact portion"). As shown in FIG. 1, the liquid crystal device 100 includes an optically transparent first substrate 10 and an optically transparent second substrate 20, which are opposed to each other, and liquid crystal 30 sealed in a gap between the substrates. Note that, in FIG. 1, an alignment layer and a seal material are not shown in the drawing.

A wiring layer 21 is formed on a surface of the second substrate 20, opposite the first substrate 10. The wiring layer 21 includes various wirings and switching elements. On the surface of the wiring layer 21, a plurality of pixel electrodes 22 are arranged in a matrix and are formed so as to be spaced apart from each other. The surface of the wiring layer 21, on which the plurality of pixel electrodes 22 are formed, is covered with an insulating layer 24.

A plurality of opposite electrodes 26, which are opposed to the corresponding pixel electrodes 22, are formed on the surface of the insulating layer 24. The pixel electrodes 22 and the opposite electrodes 26 each are formed of optically transparent conductor (for example, ITO (Indium Tin Oxide)). Each of the opposite electrodes 26 has a large number of slits 261 for generating fringe electric field E between the pixel electrodes 22 and the opposite electrode 26. A driving circuit 50 shown in FIG. 1 controls a voltage (fringe electric field E) applied between the pixel electrodes 22 and the opposite electrodes 26 and, thereby, drives the liquid crystal 30 in units of pixel electrode 22. That is, the liquid crystal 30 operates in an FFS (Fringe Field Switching) mode.

A plurality of pigmented layers 12 that are opposed to the pixel electrodes 22 are formed on the surface of the first substrate 10, opposite the second substrate 20. Each of the pigmented layers 12 selectively passes a component of wavelength corresponding to any one of a plurality of display colors (red color, green color, blue color) among rays of light that travel from the liquid crystal 30 toward the first substrate 10.

A detection electrode 16 is formed on the surface of the first substrate 10, which is on the opposite side (outer side) relative to the liquid crystal 30. The detection electrode 16 is an electrode for detecting a contact on the basis of variation in capacitance. The detection electrode 16 of the present embodiment is formed of optically transparent conductor (for example, ITO) so as to be continuously distributed all over the first substrate 10.

A detection circuit 60 shown in FIG. 1 detects an electrical signal (hereinafter, referred to as "detection signal") SD from the detection electrode 16 and specifies the position of a contact portion on the basis of the detection signal SD. For example, the detection circuit 60, when a common alternating voltage is applied to a plurality of terminals (for example, four corners) of the detection electrode 16, detects electric currents flowing from the terminals to the contact portion as the detection signals SD, and then specifies the position of the contact portion on the basis of electric current values of the detection signals SD. However, an embodiment of the detection electrode 16 may be selected. For example, a configuration in which a plurality of the detection electrodes 16 are arranged in a matrix may also be employed The detection circuit 60 specifies the position of a contact portion on the basis of the detection signals SD acquired from the detection electrodes 16 of each row and each column.

A polarizer 18 is adhered on the face of the detection electrode 16. Similarly, a polarizer 28 is adhered on the face of the second substrate 20, which is on the opposite side relative to the liquid crystal 30. A lighting device 35 is provided on the rear side of the liquid crystal device 100 (on the opposite side relative to the liquid crystal 30 as viewed from the second substrate 20). Light emitted from the lighting device 35 passes through the second substrate 20, the liquid crystal 30, the pigmented layers 12, the first substrate 10 and the detection electrode 16, in the stated order, and exits toward a viewer's side, thus displaying an image.

Figure 2:
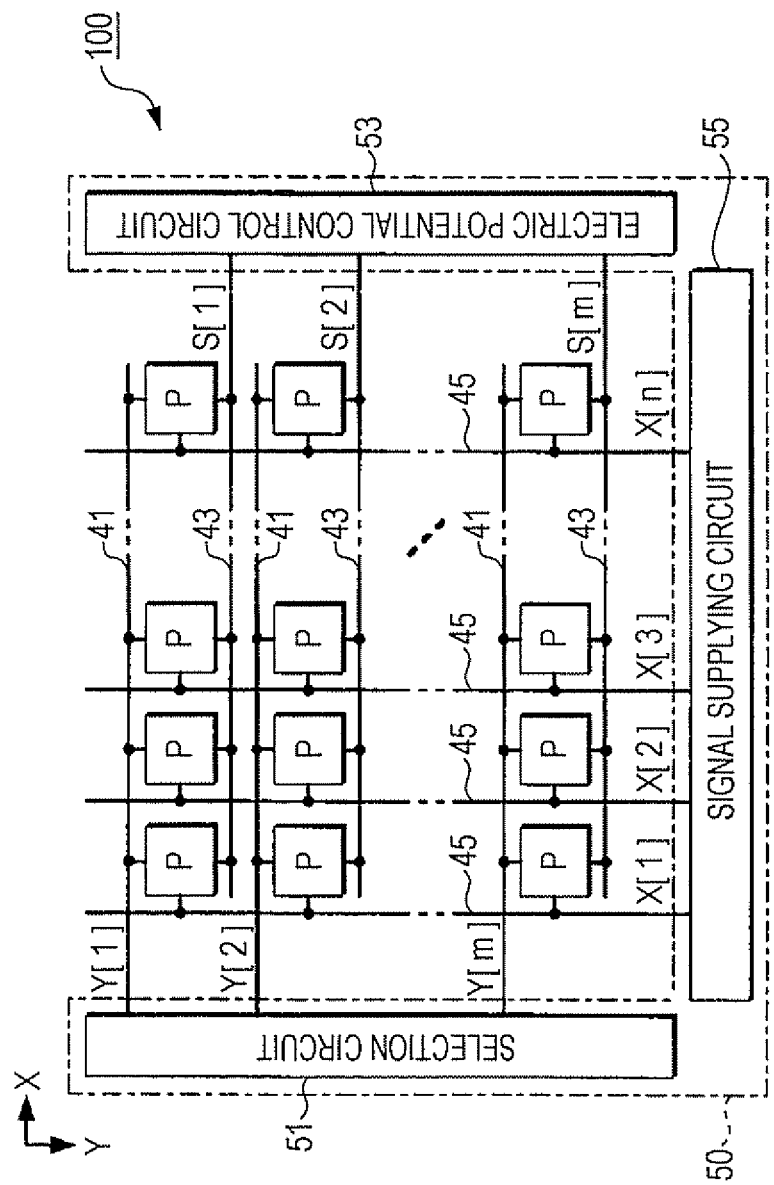
FIG. 2 is a block diagram that shows an electrical configuration of the liquid crystal device.

FIG. 2 is a block diagram that shows an electrical configuration of elements of the liquid crystal device 100 for displaying an image. As shown in FIG. 2, m scanning lines 41, m control lines 43, n signal lines 45 are formed on the second substrate 20 (m and n are natural numbers). The scanning lines 41 extend in an X direction. The control lines 43 are in pairs with the scanning lines 41 and extend in the X direction. The signal lines 45 extend in a Y direction perpendicular to the X direction. Pixel circuits P are arranged at positions corresponding to intersections of the scanning lines 41 and the signal lines 45. Thus, the pixel circuits P are arranged in a matrix of m rows X and n columns along the X direction and the Y direction.

Figure 3:
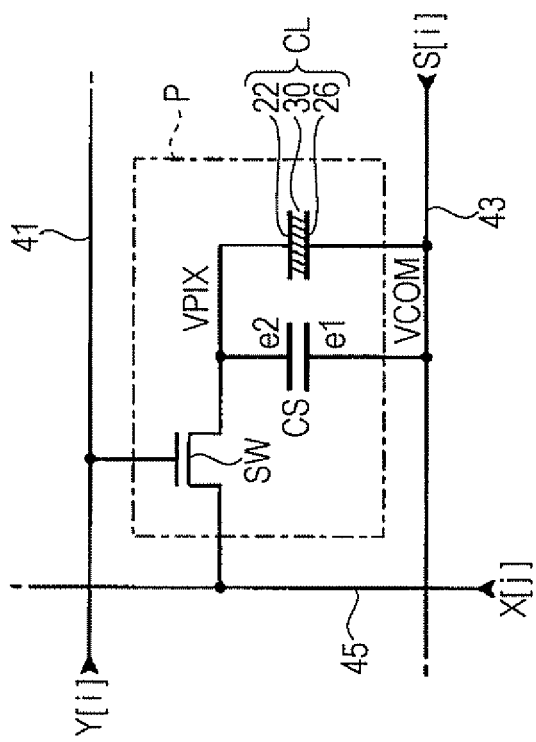
FIG. 3 is a circuit diagram that shows a configuration of a pixel circuit.

FIG. 3 is a circuit diagram that shows a configuration of one of the pixel circuits P. In the drawing, only one pixel circuit P in the j-th column (j=1 to n), belonging to the i-th row (i=1 to m), is typically shown. As shown in FIG. 3, the pixel circuit P includes a liquid crystal capacitor CL, a storage capacitor CS and a switching element SW. The switching elements SW are formed in the wiring layer 21, shown in FIG. 1, together with the scanning lines 41 and the signal lines 45.

A liquid crystal capacitor CL is a capacitor that is formed of the pixel electrode 22, the opposite electrode 26, and the liquid crystal 30 to which fringe electric field between the electrodes is applied. A storage capacitor CS includes a first electrode e1 and a second electrode e2. The second electrode e2 is electrically connected to the pixel electrode 22 of the liquid crystal capacitor CL. The opposite electrode 26 and the first electrode e1 in each of the i-th row pixel circuits P are commonly connected to the i-th row control line 43. Note that the control lines 43 and the opposite electrodes 26 are actually formed integrally with each other as stripe wirings. In addition, a portion at which the pixel electrode 22 and the opposite electrode 26 are opposed to each other through the insulating layer 24 functions as the storage capacitor CS. Thus, a portion of the opposite electrode 26 corresponds to the first electrode e1, and a portion of the pixel electrode 22 corresponds to the second electrode e2.

The switching element SW of each pixel circuit P in the j-th column is an n-channel thin-film transistor that is connected between the pixel electrode 22 and the j-th column signal line 45 to control electrical connection (conduction or non-conduction) therebetween. The gates of the switching elements SW of the pixel circuits P in the i-th row are commonly connected to the i-th scanning line 41.

As shown in FIG. 2, the driving circuit 50 includes a selection circuit 51, an electric potential control circuit 53 and a signal supplying circuit 55. Note that the driving circuit 50 may be formed of a single integrated circuit or may be formed of multiple integrated circuits. In addition, the driving circuit 50 may be formed of switching elements (thin-film transistors) that are formed on the surface of the second substrate 20 together with the switching elements SW of the pixel circuits P.

Figure 4:
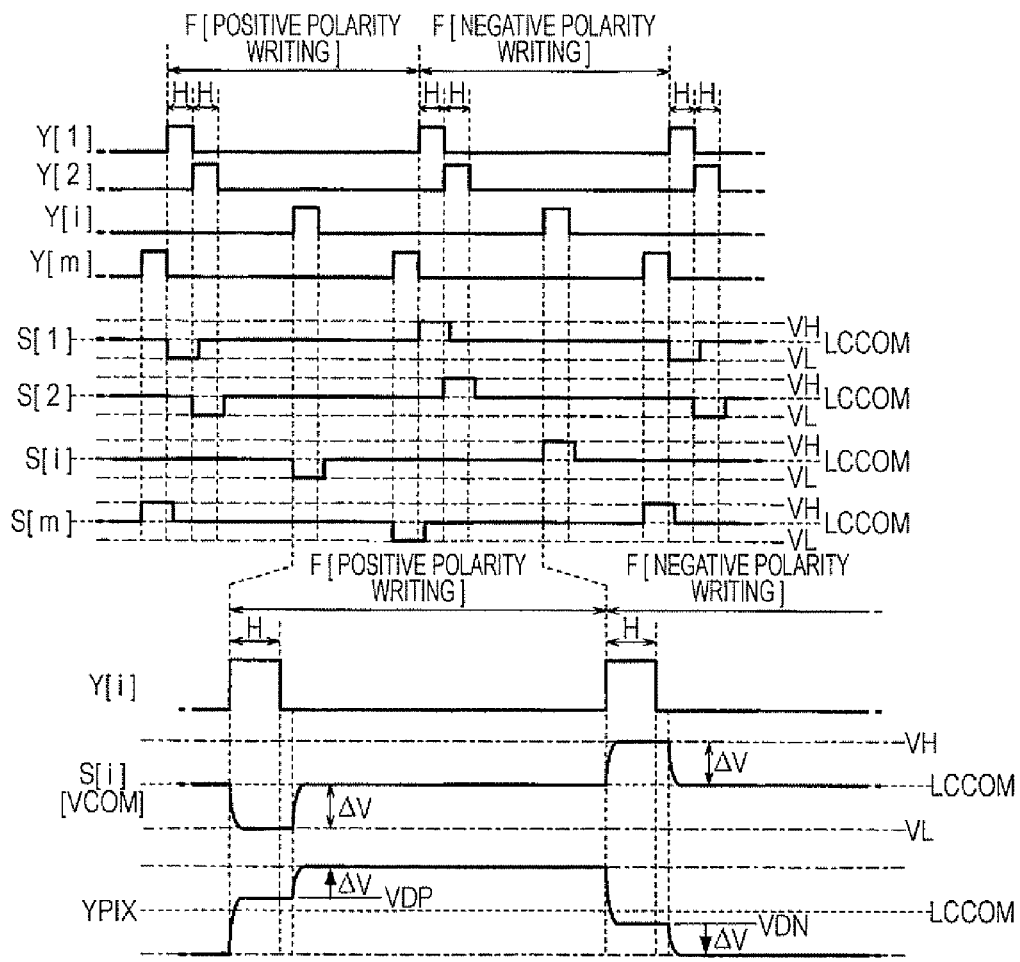
FIG. 4 is a timing chart that illustrates an operation of the liquid crystal device.

FIG. 4 is a timing chart that illustrates an operation of the liquid crystal device 100. The selection circuit 51 generates selection signals Y[1] to Y[m] for sequentially selecting m scanning lines 41 (pixel circuits P in the rows), and outputs them to the scanning lines 41. As shown in FIG. 4, a selection signal Y[i] supplied to the i-th scanning line 41 is at an active level (high level) during the i-th selection period (horizontal scanning period) H within a single frame period F, and maintains a low level during a period other than the selection period H. Thus, the switching element SW of each pixel circuit P in the i-th row is conducted during the i-th selection period H within the frame period F and, after the selection period H has elapsed, is shifted into a non-conductive state.

The signal supplying circuit 55 shown in FIG. 2 generates data signals X[1] to X[n] that specify the gray scale levels of the pixel circuits P and outputs them to the corresponding signal lines 45. A data signal X[j] supplied to the j-th column signal line 45 is applied with an electric potential VD (VDP or VDN) corresponding to a gray scale level that is specified by the j-th column pixel circuit P in the i-th row during a selection period H when the selection signal Y[i] is at a high level.

The liquid crystal device 100 employs a frame inversion driving method in which a polarity of voltage applied to the liquid crystal capacitor CL is inverted every frame period F. The data signal X[j] is set to an electric potential VDP during a selection period H within a frame period F when a voltage of positive polarity is being applied to the liquid crystal capacitor CL (hereinafter, referred to as "positive polarity writing") and is set to an electric potential VDN during a selection period H within a frame period F when a voltage of negative polarity is being applied to the liquid crystal capacitor CL (hereinafter, referred to as "negative polarity writing").

The electric potential control circuit 53 generates control signals S[1] to S[m] for determining voltages applied to the liquid crystal capacitors CL of the pixel circuits P and outputs them to the corresponding control lines 43. Each of the control signals S[1] to S[m] is controlled to any one of a reference electric potential LCCOM, an electric potential VH and an electric potential VL. As shown in FIG. 4, the electric potential VH is higher in potential than the reference electric potential LCCOM, and the electric potential VL is lower in potential than the reference electric potential LCCOM. In addition, the reference electric potential LCCOM is an intermediate electric potential between the electric potential VH and the electric potential VL. That is, an electric potential difference $\Delta V$ between the electric potential VH and the reference electric potential LCCOM is equal to an electric potential difference $\Delta V$ between the reference electric potential LCCOM and the electric potential VL (VH−LCCOM=LCCOM−VL=$\Delta V$).

A control signal S[i] supplied to the i-th control line 43 (the first electrode e1 and the opposite electrode 26 of each pixel circuit P in the i-th row) is set to any one of the electric potential VH and the electric potential VL at a leading point of the selection period H during which the selection signal Y[i] is at a high level, as shown in FIG. 4. More specifically, the control signal S[i] is set to the electric potential VL during the i-th selection period H within the frame period F when the positive polarity writing is performed and is set to the electric potential VH during the i-th selection period H within the frame period F when the negative polarity writing is performed. In addition, the control signal S[i] is changed to the reference electric potential LCCOM after the selection period H during which the selection signal Y[i] is at a high level has elapsed (after the selection signal Y[i] is shifted into a low level), and maintains the reference electric potential LCCOM until the selection period H when the control signal S[i] attains a high level next time.

Next, the operation of the j-th column pixel circuit P in the i-th row will be described. As the selection signal Y[i] is shifted into a high level in the selection period H, the switching element SW is conducted and thereby the pixel electrode 22 and the second electrode e2 are electrically connected to the corresponding signal line 45. In addition, the control signal S[i] is set to one of the electric potential VH and the electric potential VL. Thus, as shown in FIG. 4, in the selection period H within the frame period F when the positive polarity writing is performed, an electric potential VPIX of the pixel electrode 22 and second electrode e2 is set to the electric potential VDP of the data signal X[j], and an electric potential VCOM of the first electrode e1 and opposite electrode 26 is set to the electric potential VL. Moreover, in the selection period H within the frame period F when the negative polarity writing is performed, the electric potential VPIX is set to the electric potential VDN, and the electric potential VCOM is set to the electric potential VH.

As the selection signal is shifted into a low level at a trailing point of the selection period H, the switching element SW is changed to a non-conductive state. On the other hand, after the selection period H has elapsed, the control signal S[i] is shifted into the reference electric potential LCCOM. Thus, the electric potential VCOM rises from the electric potential VL to the reference electric potential LCCOM in the frame period F of the positive polarity writing, and the electric potential VCOM falls from the electric potential VH to the reference electric potential LCCOM in the frame period F of the negative polarity writing. The electric potential VCOM is maintained at the reference electric potential LCCOM until the selection signal Y[i] attains a high level next time.

On the other hand, when the switching element SW is shifted into a non-conductive state, the pixel electrode 22 and the second electrode e2 both enter an electrical floating state. Therefore, as the electric potential VCOM of the first electrode e1 and opposite electrode 26 changes after the selection period H has elapsed, the electric potential VPIX varies from the electric potential VD (VDP, VDN), which is set in the selection period H, by an amount of change Δ the electric potential VCOM changes. That is, as shown in FIG. 4, the electric potential VPIX rises by an amount of change ΔV from the electric potential VDP after the selection period H during which the positive polarity writing is performed has elapsed, and the electric potential VPIX falls by an amount of change ΔV from the electric potential VDN after the selection period H during which the negative polarity writing is performed has elapsed. The electric potential VPIX is maintained at the electric potential (VD±ΔV), after it has been changed, corresponding to the control signal S[i] until the selection signal Y[i] attains a high level next time. The electric potential VD of the data signal X[j] during the selection signal H is set so that the electric potential VPIX, after it has been changed, corresponding to variation in the control signal S[i] (furthermore, a voltage applied to the liquid crystal capacitor CL) becomes an electric potential corresponding to a gray scale level specified by the pixel circuit P.

Figure 5:
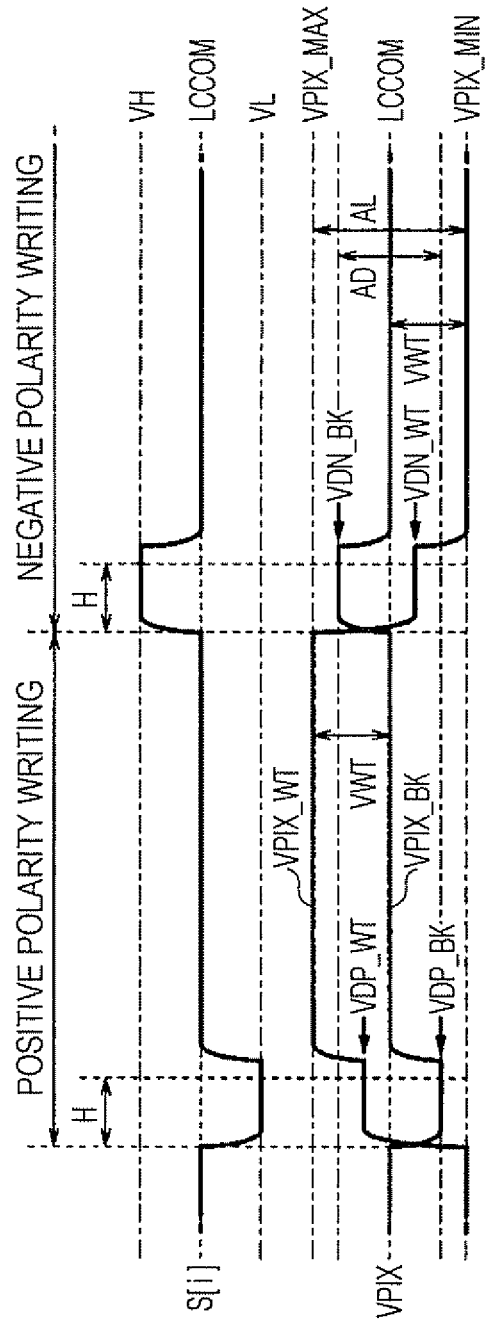
FIG. 5 is a timing chart that shows an electric potential of the pixel electrode in black display and in white display.

FIG. 5 is a timing chart that shows an electric potential VPIX_WT of the pixel electrode 22 when white color (maximum gray scale level) is displayed, and an electric potential VPIX_BK of the pixel electrode 22 when black color (minimum gray scale level) is displayed. In the drawing, a normally black mode is assumed, in which a gray scale level (transmission ratio) decreases as the voltage of the liquid crystal capacitor CL decreases.

When black color is specified by the pixel circuit P, the electric potential VDP_BK during the positive polarity writing and the electric potential VDN_BK during the negative polarity writing are set so that the electric potential VPIX_BK substantially coincides with the reference electric potential LCCOM after the selection period has elapsed, as shown in FIG. 5. In addition, when white color is specified by the pixel circuit P, the electric potential VDP_WT during the positive polarity writing is set so that the electric potential VPIX_WT, after the selection period H has elapsed, becomes a maximum value VPIX_MAX, and the electric potential VDN_WT during the negative polarity writing is set so that the electric potential VPIX_WT, after the selection period H has elapsed, becomes a minimum value VPIX_MIN. That is, the electric potential VD of the data signal X[j] is set in correspondence with a gray scale level specified by the pixel circuit P within a range of amplitude AD from the electric potential VDP_BK to the electric potential VDN_BK.

In the above embodiment, among the control signals S[1] to S[m] supplied to the m opposite electrodes 26, only the control signal S[i] in the row selected by the selection circuit 51 is set to the electric potential VH or the electric potential VL, and the other control signals, other than the control signal S[i], is maintained at the reference electric potential LCCOM. Thus, for example, in comparison with a configuration in which the electric potential of an opposite electrode that continuously extends over the entire face of the first substrate 10 periodically varies (for example, the configuration described in JP-A-2006-146895), it is possible to reduce noise of the detection electrode 16 due to variation in electric potential of the opposite electrodes 26 (moreover, it is possible to specify the position of a contact portion with high accuracy). Furthermore, because there is no need in principle to provide an exclusive circuit, for example, described in JP-A-2006-146895, that removes noise from the detection signal SD or a shield that suppresses an influence of variation in the electric potential VPIX on the detection electrode 16, it is advantageous in that the configuration of the liquid crystal device 100 may be simplified.

Further, because the opposite electrodes 26 are located on the side of the detection electrode 16 with respect to the wiring layer 21 and the pixel electrodes 22, the opposite electrodes 26 function as a shield to shield an influence given to the detection electrode 16 by the variation in electric potentials of the scanning lines 41, signal lines 45, and pixel electrodes 22. Thus, it is possible to reduce noise of the detection electrode 16 due to variation in electric potential of the selection signal [i], variation in electric potential VD of the data signal X[j], and/or variation in the electric potential VPIX of the pixel electrodes 22.

Incidentally, only in view of suppressing noise of the detection electrode 16 due to variation in electric potential of the opposite electrodes 26, a configuration in which the electric potentials of all the opposite electrodes 26 are fixed to the reference electric potential LCCOM (hereinafter, referred to as "first comparative embodiment") may be employed. In the first comparative embodiment, the electric potential VPIX of the pixel electrode 22 is set to the electric potential VD of the data signal X[j] that is supplied during the selection period H. Thus, in order to apply the voltage VWT in white display, as shown in FIG. 5, to the liquid crystal capacitor CL under the configuration of the first comparative embodiment, it is necessary to vary the electric potential VD of the data signal X[i] in a range of amplitude AL from a minimum value VPIX_MIN to a maximum value VPIX_MAX. In contrast, in the present embodiment, because the electric potential VPIX of the pixel electrode 22 is set to an electric potential such that the electric potential VD within the selection period H is varied in accordance with the control signal S[i], the amplitude AD necessary for the data signal X[j] is suppressed in comparison with the first comparative embodiment. Thus, according to the present embodiment, it is advantageous in that noise of the detection electrode 16 due to variation in the electric potential VD of the data signal X[j] is suppressed while making it possible to reduce electric power consumed in the signal supplying circuit 55.

In addition, in the present embodiment, the detection electrode 16 is formed on the surface of the first substrate 10. Thus, in comparison with a configuration in which the detection electrode 16 is adhered onto a substrate that is independent of the first substrate 10 and the substrate is then fixed to the first substrate 10 (hereinafter, referred to as "second comparative embodiment"), a reduction in the number of components of the liquid crystal device 100 and/or a thin-shaped liquid crystal device 100 may be realized Moreover, it is advantageous in that usability of light emitted from the lighting device 35 is improved by an amount a substrate exclusively used for adhering the detection electrode 16 is omitted. Note that, in the present embodiment as described above, because noise of the detection electrode 16 is reduced by suppressing variation in electric potentials of portions in the liquid crystal device 100, it is possible to sufficiently suppress noise of the detection electrode 16 by directly forming the detection electrode 16 on the first substrate 10 in spite of a configuration in which the detection electrode 16 is located in proximity to the second substrate 20 in comparison with the second comparative embodiment (that is, a configuration in which noise in accordance with variation in electric potential in the liquid crystal device 100 is likely to be generated in the detection electrode 16). That is, the function of the present embodiment in which variation in electric potentials of portions in the liquid crystal device 100 is suppressed is particularly effective for a configuration in which the detection electrode 16 is directly formed on the first substrate 10.

B: Alternative Embodiments

The above described embodiments may be modified into various alternative embodiments. Specific alternative embodiments may be exemplified as follows. Note that the following embodiments may be appropriately combined.

(1) First Alternative Embodiment

In the above embodiments, the frame inversion driving method in which positive polarity writing and negative polarity writing are alternately performed every frame period is exemplified; however, a period of switching between positive polarity writing and negative polarity writing is not limited to a frame period F. For example, line inversion driving method in which positive polarity writing and negative polarity writing are alternately performed every selection period H (in units of row) or dot inversion driving method in which positive polarity writing and negative polarity writing are alternately performed every pixel circuit P adjacently arranged in an X direction and in a Y direction may also be employed. Furthermore, positive polarity writing and negative polarity writing may be switched in units of a plurality of frame periods F.

(2) Second Alternative Embodiment

In the above embodiments, the configuration in which the control signal S[i] is set to the electric potential VH or the electric potential VL at the leading point of the selection period H is exemplified; however, a configuration in which the control signal S[i] is set to the electric potential VH or the electric potential VL before or after the commencement of the selection period H may also be employed. That is, it is only necessary that the control signal S[i] is maintained at the electric potential VH or the electric potential VL at the trailing point of the selection period H.

(3) Third Alternative Embodiment

In the above described embodiments, the configuration in which the plurality of pixel electrodes 22 are arranged in a matrix is exemplified; however, the shape and/or arrangement of the pixel electrodes 22 may be selected. For example, it is applicable that the shaper number and/or arrangement of the pixel electrodes 22 are selected so as to match an image of an operator that indicates a portion to be operated by a user.

C: Application Embodiments

Figure 6:
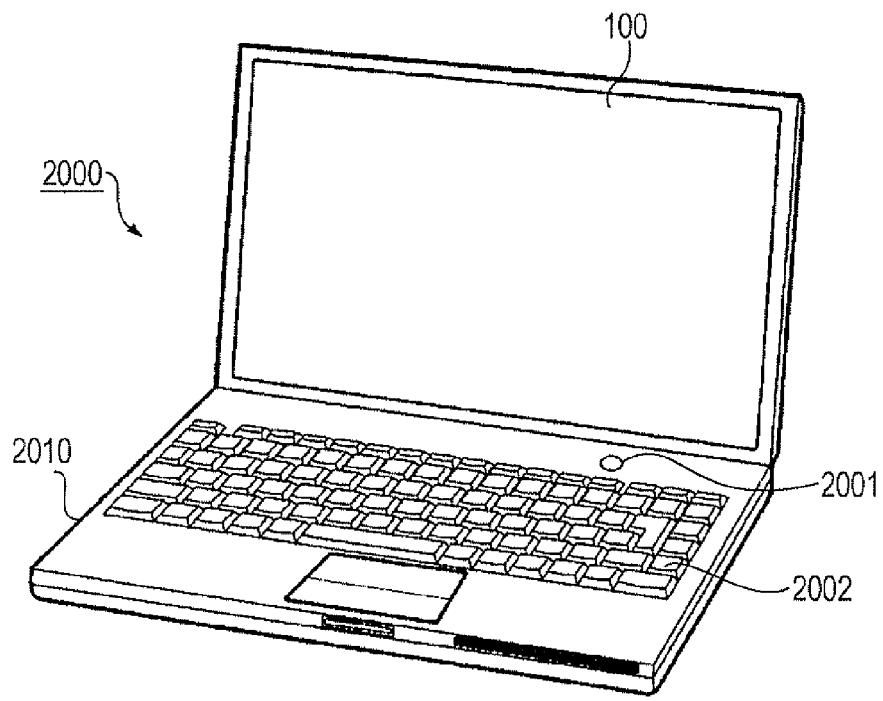
FIG. 6 is a perspective view that shows an embodiment of an electronic apparatus (personal computer) according to the invention.
Figure 7:
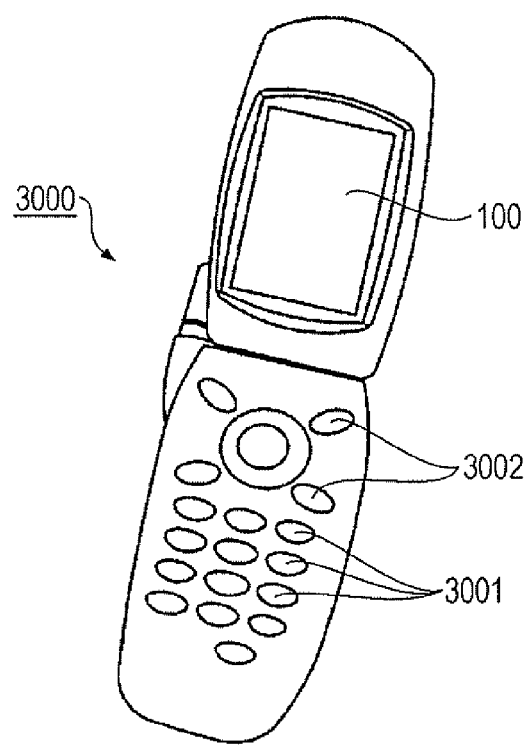
FIG. 7 is a perspective view that shows an embodiment of an electronic apparatus (cellular phone) according to the invention.
Figure 8:
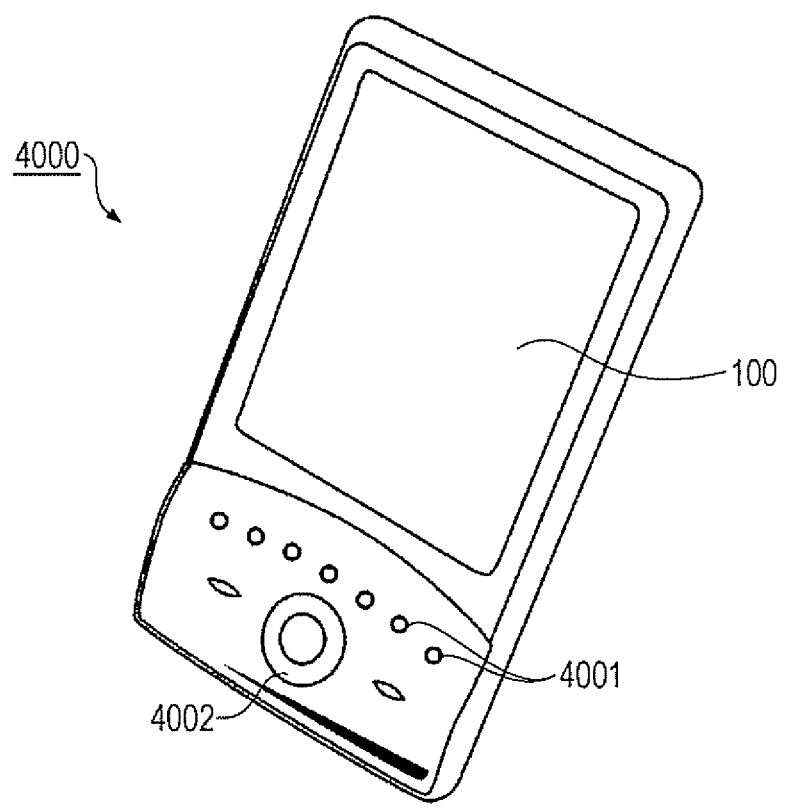
FIG. 8 is a perspective view that shows an embodiment of an electronic apparatus (personal digital assistants) according to the invention.

Next, electronic apparatuses that employ the liquid crystal device according to the aspects of the invention will be described. In FIG. 6 to FIG. 8, embodiments of electronic apparatuses that use the liquid crystal device 100 according to any one of the embodiments described above as a display device are shown.

FIG. 6 is a perspective view that shows a configuration of a mobile personal computer that uses the liquid crystal device 100. The personal computer 2000 includes the liquid crystal device 100 that displays various images and a body portion 2010 that has a power switch 2001 and a keyboard 2002.

FIG. 7 is a perspective view that shows a configuration of a cellular phone to which the liquid crystal device 100 is applied. The cellular phone 3000 includes a plurality of operation buttons 3001, a plurality of scroll buttons 3002, and the liquid crystal device 100 that displays various images. By manipulating the scroll buttons 3002, an image displayed on the liquid crystal device 100 is scrolled.

FIG. 8 is a perspective view that shows a configuration of a personal digital assistants (PDA) to which the liquid crystal device 100 is applied. The personal digital assistants 4000 includes a plurality of operation buttons 4001, a power switch 4002, and the liquid crystal device 100 that displays various images. As the power switch 4002 is manipulated, various pieces of information, such as an address book and a schedule book, are displayed on the liquid crystal device 100.

Note that the electronic apparatuses that employ the liquid crystal device according to the aspects of the invention include, in addition to the apparatuses shown in FIG. 6 to FIG. 8, a digital still camera, a television, a video camera, a car navigation system, a pager, an electronic personal organizer, an electronic paper, an electronic calculator, a word processor, a workstation, a video telephone, a POS terminal, a printer, a scanner, a photocopier, and a video player.

What is claimed is:

1. A liquid crystal device comprising:
a first substrate;
a second substrate that is opposed to the first substrate;
liquid crystal that is sealed in a gap between the first substrate and the second substrate;
a detection electrode that is provided on a side of the first substrate, opposite to a side on which the liquid crystal is provided, wherein the detection electrode detects a contact on the basis of variation in capacitance;
a plurality of scanning lines;
at least one signal line that intersects with the plurality of scanning lines;
a plurality of control lines that are provided in correspondence with the scanning lines;
a plurality of pixel circuits that are formed in the second substrate at positions corresponding to intersections of the at least one signal line and the plurality of scanning lines, wherein each of the plurality of pixel circuits includes a storage capacitor, a liquid crystal capacitor formed of a pixel electrode that is connected through a switching element to a corresponding one of the at least one signal line, an opposite electrode that is formed between the pixel electrode and the liquid crystal and is connected to a corresponding one of the control lines, and the liquid crystal to which lateral electric field generated between the pixel electrode and the opposite electrode is applied;
a selection circuit that selects each of the plurality of scanning lines in every selection period arranged at an early stage of each inversion unit, wherein the selection circuit makes the switching element of the pixel circuit a conductive state during one selection period in one inversion unit, the pixel circuit corresponding to the scanning line selected during the one selection period and wherein the selection circuit makes the switching element of the pixel circuit a non-conductive state after the one selection period in the one inversion unit;

a signal supplying circuit that supplies a data signal to the signal line during each of the selection periods, the data signal being supplied with an electric potential corresponding to a gray scale level designated for the pixel circuit; and an electric potential control circuit that generates a control signal for determining a voltage to be applied to the liquid crystal capacitor in the pixel circuit corresponding to the selected scanning line, and outputs the control signal to the corresponding one of the control lines, wherein the plurality of control lines are disposed between a detection electrode and at least the pixel electrode, an electric potential of the control signal is set to a low electric potential when the polarity of voltage to be applied to the liquid crystal capacitor is positive in a first selection period in a first inversion unit, set to a reference electric potential after the first selection period in the first inversion unit, set to a high electric potential when the polarity of voltage to be applied to the liquid crystal capacitor is negative in a second selection period in a second inversion unit consecutive to the first inversion unit, and set to the reference electric potential after the second selection period in the second inversion unit, the reference electric potential being an intermediate electric potential between the low electric potential and the high electric potential, and among the plurality of control lines, only an electric potential to be applied to the control line corresponding to the scanning line selected by the selection circuit is set to the low electric potential or the high electric potential during the selection period, while an electric potential to be applied to the control lines corresponding to the non-selected scanning lines are maintained at the reference electric potential, thereby reducing a noise of the detection electrode due to variation in electric potential of the opposite electrodes.

2. The liquid crystal device according to claim 1, wherein the detection electrode is formed on a surface of the first substrate, which is opposite to a surface on which the liquid crystal is provided.

3. An electronic apparatus comprising the liquid crystal device according to claim 1.

4. A method of driving a liquid crystal device that includes a first substrate, a second substrate opposed to the first substrate, liquid crystal sealed in a gap between the first substrate and the second substrate, a plurality of scanning lines, at least one signal line that intersects with the plurality of scanning lines, a plurality of control lines that are provided in correspondence with the plurality of scanning lines, a plurality of pixel circuits formed in the second substrate at positions corresponding to intersections of the at least one signal line and the plurality of scanning lines, wherein each of the plurality of pixel circuits includes, a storage capacitor, a liquid crystal capacitor, which is formed of a pixel electrode, an opposite electrode that is formed between the pixel electrode and the liquid crystal and is connected to a corresponding one of the control lines, and the liquid crystal to which lateral electric field generated between the pixel electrode and the opposite electrode is applied, wherein the liquid crystal device further includes a detection electrode that is provided on a side of the first substrate, opposite to a side on which the liquid crystal is provided and that detects a contact on the basis of variation in capacitance, and wherein the plurality of control lines are disposed between a detection electrode and at least the pixel electrode, the method comprising:

selecting each of the plurality of scanning lines in every selection period arranged at an early stage of each inversion unit;

connecting the pixel electrode of the pixel circuit corresponding to the selected scanning line to a corresponding one of the at least one signal line during one selection period in one inversion unit and disconnecting the pixel electrode of the pixel circuit from the corresponding one of the at least one signal line after the one selection period in the one inversion unit;

supplying a data signal to the signal line during the corresponding selection period, the data signal being supplied with an electric potential corresponding to a gray scale level designated for the pixel circuit; and generating a control signal for determining a voltage to be applied to the liquid crystal capacitor in the pixel circuit corresponding to the selected scanning line, and outputting the control signal to the corresponding one of the control lines, wherein an electric potential of the control signal is set to a low electric potential when the polarity of voltage to be applied to the liquid crystal capacitor is positive in a first selection period in a first inversion unit, set to a reference electric potential after the first selection period in the first inversion unit, set to a high electric potential when the polarity of voltage to be applied to the liquid crystal capacitor is negative in a second selection period in a second inversion unit consecutive to the first inversion unit, and set to the reference electric potential after the second selection period in the second inversion unit, the reference electric potential being an intermediate electric potential between the low electric potential and the high electric potential, and among the plurality of control lines, only an electric potential to be applied to the control line corresponding to the scanning line selected by the selection circuit is set to the low electric potential or the high electric potential during the selection period, while an electric potential to be applied to the control lines corresponding to the non-selected scanning lines are maintained at the reference electric potential, thereby reducing a noise of the detection electrode due to variation in electric potential of the opposite electrodes.

5. The liquid crystal device according to claim 1, wherein the storage capacitor has a first electrode and a second electrode, the first electrode being connected to the corresponding one of the control lines to which the opposite electrode is connected, and the second electrode being connected to the pixel electrode of the liquid crystal capacitor, an absolute difference between the reference electric potential and the low electric potential of the control signal is equal to an absolute difference between the reference electric potential and the high electric value of the control signal, and an electric potential of the pixel electrode of the liquid crystal capacitor and the second electrode of the storage capacitor is set to a first electric potential which is higher than the reference electric potential during the first selection period, set to a second electric potential which is equal to a value obtained by adding the absolute difference to the first electric potential after the first selection period in the first inversion unit, set to a third electric potential which is lower than the reference electric potential during the second selection period, and set to a fourth electric potential which is equal to a value obtained by subtracting the absolute difference from the third electric potential after the second selection period in the second inversion unit.

6. The method according to claim 4, wherein the storage capacitor has a first electrode and a second electrode, the first electrode being connected to the corresponding one of the control lines to which the opposite electrode is connected, and the second electrode being connected to the pixel electrode of the liquid crystal capacitor, an absolute difference between the reference electric potential and the low electric potential of the control signal is equal to an absolute difference between the reference electric potential and the high electric value of the control signal, and an electric potential of the pixel electrode of the liquid crystal capacitor and the second electrode of the storage capacitor is set to a first electric potential which is higher than the reference electric potential during the first selection period, set to a second electric potential which is equal to a value obtained by adding the absolute difference to the first electric potential after the first selection period in the first inversion unit, set to a third electric potential which is lower than the reference electric potential during the second selection period, and set to a fourth electric potential which is equal to a value obtained by subtracting the absolute difference from the third electric potential after the second selection period in the second inversion unit.

\* \* \* \* \*